A. P. CRELL.
FUEL RESERVE DEVICE FOR LIQUID FUEL TANKS.
APPLICATION FILED OCT. 6, 1919.

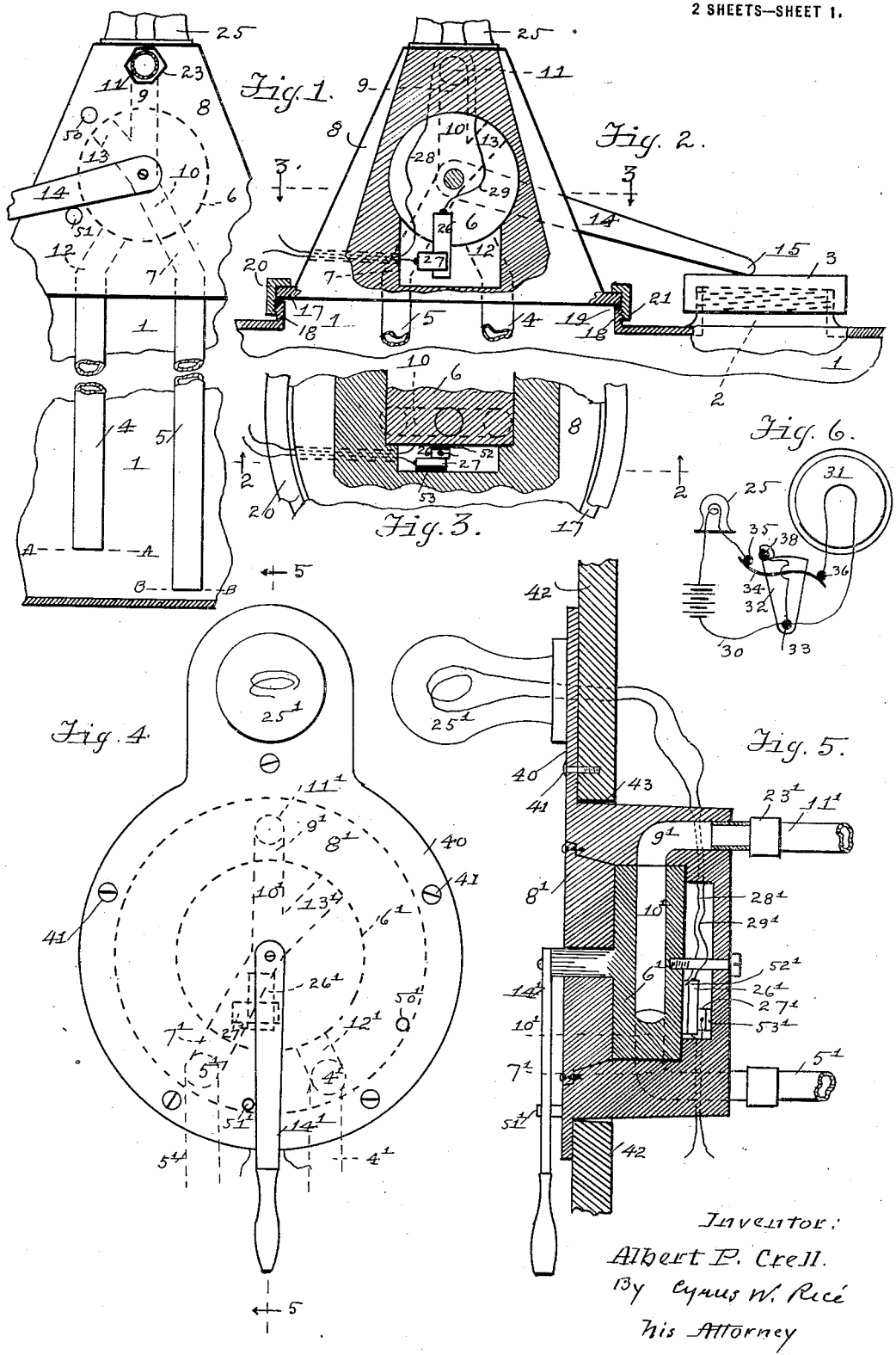

1,359,336.

Patented Nov. 16, 1920.
2 SHEETS—SHEET 2.

Inventor:
Albert P. Crell
By Cyrus W. Rice
his Attorney.

UNITED STATES PATENT OFFICE.

ALBERT P. CRELL, OF GRAND RAPIDS, MICHIGAN.

FUEL-RESERVE DEVICE FOR LIQUID-FUEL TANKS.

1,359,336.   Specification of Letters Patent.   Patented Nov. 16, 1920.

Application filed October 6, 1919. Serial No. 328,793.

*To all whom it may concern:*

Be it known that I, ALBERT P. CRELL, a citizen of the United States, residing at Grand Rapids, in the county of Kent and State of Michigan, have invented new and useful Improvements in Fuel-Reserve Devices for Liquid-Fuel Tanks, of which the following is a specification.

The present invention relates to fuel reserve devices for liquid fuel tanks and its object is, generally, to provide an improved device of that character; a further object is to provide such a device having a plurality of fuel conduits adapted to draw the fuel from the tank at different levels respectively and having improved means for indicating from which level the fuel is being drawn; a further object is to provide such a device having such conduits and means for preventing the replenishing of the tank while the device is in that adjustment in which the fuel is drawn from a certain level.

These and any other objects hereinafter appearing are attained by, and the invention finds preferable embodiment in, the device particularly described in the body of this specification and illustrated by the accompanying drawings, in which:—

Figure 1 is a front view of such a device;

Fig. 2 is a rear view of the same partly in section taken on a vertical plane corresponding to line 2—2 of Fig. 3;

Fig. 3 is a sectional view of a portion of the same taken on a horizontal plane corresponding to line 3—3 of Fig. 2;

Fig. 4 is a front view of a modified form of said device;

Fig. 5 is a sectional view of the same taken on a plane corresponding to line 5—5 of Fig. 4;

Figure 7:
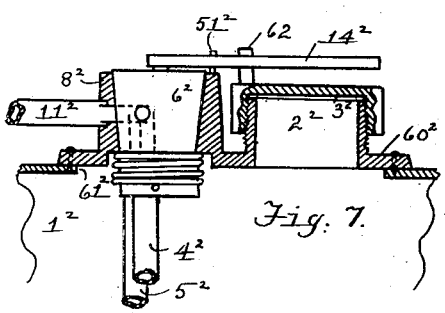
Figure 9:
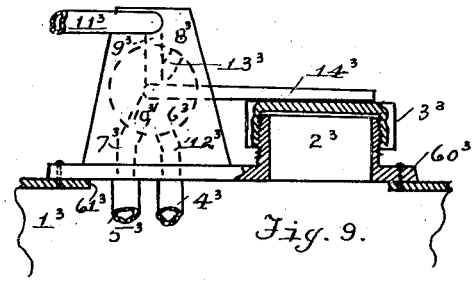
Figure 8:
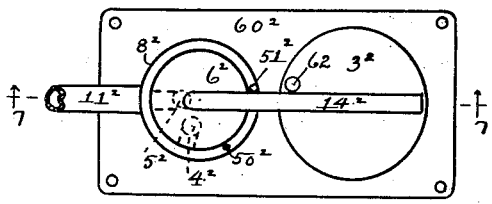
Figure 10:
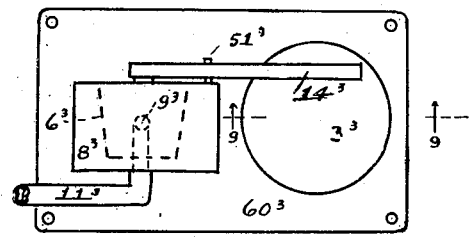

Fig. 6 is a view showing diagrammatically a switch for cutting electric lamps and the like out of an electric circuit in which an electric indicator of said device is included, together with the electric connections for the same, etc.; and Figs. 7, 8, 9 and 10 show modified forms of the device, Fig. 7 being a partially sectioned view taken on a vertical plane corresponding to line 7—7 of Fig. 8, and Fig. 9 being a like view taken on a vertical plane corresponding to line 9—9 of Fig. 10.

In the embodiment of the invention chosen for illustration by the drawings and for detailed description in the body of this specification, my device is shown applied to an automobile, only such parts of the automobile as the liquid-fuel tank, the cowl or instrument board, etc. being shown.

The tank 1 of any common form is adapted to contain the liquid fuel, and is provided with a fuel supply opening 2 closed by a suitable cap, as the screw cap 3. The fuel is drawn from the tank through a plurality of pipes or conduits 4, 5, one of which (4) draws the fuel from a higher level A—A and the other (5) from a lower level B—B, the object being that the fuel is drawn normally from the higher level and as necessity requires from the lower level, a reserve being thus provided between such levels to be drawn upon only when the fuel above the higher or reserve level is exhausted. A suitable valve, as the rotary valve 6, may be moved or turned to one position (shown in the drawings) for permitting the fuel to be drawn from the lower level through the conduit 5, the passage 7 in the member 8 (in which member the valve is seated) and through the passage 10 in the valve, the passage 9 in said member 8 and thence through the pipe 11 leading to the carbureter of the automobile. The valve may also be moved or turned to another or normal position for permitting the fuel to be drawn from the higher level through the conduit 4, the passage 12 in the member 8, the passages 10 and 13 in the valve, the passage 9 and thence through the pipe 11 to the carbureter. It will be seen that in the construction illustrated the fuel is forced upwardly by vacuum in pipe 11 or by means of pressure exerted by a pump (not shown) on the liquid fuel in the tank. The conduits may however be so arranged that the fuel passes downwardly through the upper ends of the conduits by gravity. The valve is moved to one or the other of its said positions by a suitable handle 14, whose extremity 15 is adjacent to and (as shown) in a position covering the cap 3 which closes the fuel supply opening 2 when the valve is moved to one of its said positions, as to that position (as shown) in which the fuel is drawn from the lower or reserve level: when, however, the valve is moved to its other position in which the fuel is drawn from the other level (the higher level as shown), the extremity of the handle is remote from and (as shown) in a position uncovering said cap or fuel supply opening. It will be seen that by this arrangement and disposition of the parts, the cap cannot be unscrewed or removed while the handle is in its said covering position, and therefore the tank cannot be replenished at such time; and when the handle is moved to its other position to permit the removal of the cap and when the tank is thereupon replenished, the fuel cannot be drawn from the lower level, thus insuring a reserve supply which cannot be drawn upon until the handle is again turned to the position in which the fuel passes through the conduit 5. When therefore the tank is refilled, the reserve supply of fuel cannot be inadvertently used.

The member 8 in Figs. 1, 2 and 3 is applied to, and removably secured on, the top of the tank by its flange 17 which is clamped between the upwardly extending annular flange 18 surrounding an orifice 19, in the top wall of the tank, and a suitable annular member 20 having the downwardly turned flange 21 threaded on the flange 18. Inasmuch as the conduits 4, 5 are in the construction shown mounted at their upper ends on this member 8, it will be seen that the device may be readily applied to and removed from the tank by merely unscrewing the union sleeve 23 (whereby the member 8 is connected with the pipe 11 leading to the carbureter) and by unscrewing the annular member 20.

An electrically energized indicator of suitable type, as the electric light 25, controlled in connection with the said movements of the valve may be employed for indicating the valve's position and the level from which the fuel is being drawn. In the construction shown, an electric contact piece 26 is carried by the movable valve and an electric contact piece 27 is carried by the member 8 in such interrelative positions that when the valve is turned to draw the fuel from the lower level (as shown) these pieces contact with each other, thus closing the electric circuit and energizing the light, and when the valve is turned to the other position, these contact pieces are separated and the light extinguished.

The electric circuit comprises the electric connections or wires 28, 29 leading to the light, the latter 29 connecting with the contact piece 26. The electric circuit energizing the light 25 is preferably the same circuit 30 employed to energize the other electric devices of the automobile, as the automobile lamps 31. In order that the light 25 indicating that the fuel is being drawn from the lower level may not be extinguished although such other electric devices are not energized, a switch is provided in the circuit, as that shown in Fig. 6. In the construction and arrangement shown in that figure, the member 32 pivotally mounted at 33 may be turned to the position shown, in which the contact spring 34 carried by the member 32 contacts with the contact points 35, 36 so that both the indicator light 25 and the automobile lamp 31 are included in the circuit: or the member 32 may be turned to another position to extinguish the automobile lamp 31 but still energize the indicator light 25, the spring 34 being in such adjustment moved from the contact points 35, 36 and the contact points 35 and 38 being brought together.

In Figs. 4 and 5 a modified construction of the device is shown. The member 8′ has a flange 40 removably secured as by screws 41 to the face of the cowl or instrument board 42 of the automobile, the body of said member extending through a suitable orifice 43 in the cowl. The valve 6′ having passages 10′ and 13′ similar to the passages 10 and 13, and the member 8′ having passages 7′, 9′ and 12′ similar to the passages 7, 9 and 12 in the member 8 as shown in Figs. 1, 2 and 3, the fuel is drawn through said passages and through the conduit 4′ or 5′, and passes through the pipe 11′ to the carbureter. The handle 14′ serves to thus turn the valve. The conduits 4′, 5′ extend to the tank, (not shown in Figs. 4 and 5) which may be located in any convenient position on the automobile, and are adapted to draw the fuel therefrom at different levels respectively as are the conduits 4 and 5 shown in Fig. 1. The indicator light may be mounted in any convenient position, as on the member 8 as seen fragmentarily in Figs. 1 and 2, or on the face portion or flange 40 of the member 8′ as shown in Figs. 4 and 5.

Parts in Figs. 4 and 5 corresponding to like parts in the other figures are indicated by the same reference numerals with a "prime" mark added thereto.

Suitable stops 50, 51 limit the movement of the handle, and suitable insulation is provided for the electric connections as seen at 52 and 53.

In Figs. 7 and 8 is shown another modified construction of the device, and in Figs. 9 and 10 still another modified construction appears. In these two modified constructions my device, comprising the valve, the conduits and the cap or closure for the fuel supply opening are all carried by a suitable base plate $60^2$, $60^3$, the fuel supply opening extending therethrough. This base plate is secured to the outer side of the upper wall of the tank, the conduits passing downwardly through an orifice $61^2$, $61^3$ in said walk. In Figs. 7 and 8 the turnable screw cap or closure $3^2$ has a lug 62 adapted to engage the handle $14^2$ of the valve and thus turn the valve, when the cap is unscrewed to uncover the fuel supply opening $2^2$.

It will thus been seen that by the arrangement shown in Figs. 7 and 8, if the valve is turned (as there shown) to draw the fuel from the lower level through the conduit $5^2$, the cap cannot be unscrewed to replenish the tank without moving the valve to the position in which the fuel is to be drawn from the higher level through the conduit $4^2$.

In Figs. 9 and 10 a similar result is effected, inasmuch as the unscrewing and removal of the cap or closure $3^3$ swings the handle $14^3$ sufficiently to open the passage for the fuel through the conduit $4^3$ whereby the fuel is drawn from the higher level. It will be seen that thus an additional means for preventing the inadvertent use of the reserve fuel below the upper level is provided.

Parts in Figs. 7 and 8 corresponding to like parts in other figures are indicated by the same reference numerals with a small coefficient "2" added: and such parts in Figs. 9 and 10 are indicated by the same reference numerals with a small coefficient "3" added.

The invention being intended to be pointed out in the claims, is not to be limited to or by details of construction of the particular embodiment thereof illustrated by the drawings or hereinbefore described.

I claim:

1. In a device of the character described; a liquid fuel tank; fuel conduits adapted to draw the fuel from the tank at different levels respectively; a valve adapted to be moved to permit the passage of the fuel through one or the other of the conduits; an electrically controlled indicator operable in connection with said movement of the valve for indicating the position to which the valve is moved.

2. In a device of the character described; a liquid fuel tank having a fuel supply opening; a closure for said opening movable to uncover the same; a fuel passage adapted to draw the fuel from the tank at different levels; a valve adapted to be moved to permit the passage of the fuel from one or another of the levels, and thus movable, by the uncovering movement of the closure, from a position in which the fuel passes from one level to another position in which the fuel passes from another level.

3. In a device of the character described; a liquid fuel tank having a fuel supply opening; a closure for said opening movable to uncover the same; a fuel passage adapted to draw the fuel from the tank at different levels; a valve adapted to be moved to permit the passage of the fuel from one or another of the levels, and thus movable, by the uncovering movement of the closure, from a position in which the fuel passes from a lower level to another position in which the fuel passes from a higher level.

4. In a device of the character described; a liquid fuel tank having a fuel supply opening; a closure for said opening turnably movable to uncover the same and having a valve engaging member; a fuel passage adapted to draw the fuel from the tank at different levels; a valve adapted to be moved to permit the passage of the fuel from one or another of the levels, and thus movable, by the said member in the closure's turning movement, from a position in which the fuel passes from one level to another position in which the fuel passes from another level.

5. A liquid fuel tank having an orifice through its wall; a device of the character described adapted to be secured to said wall and having a fuel supply opening provided with a closure, and having also fuel conduits extending through said orifice and adapted to draw the fuel from the tank at different levels respectively, and having also a valve adapted to be moved to permit the passage of the fuel through one or another of the conduits.

In testimony whereof I have hereunto set my hand at Grand Rapids, Michigan, this 3rd day of October, 1919.

ALBERT P. CRELL.